March 30, 1948. J. S. JOHNSON 2,438,806
ENGINE NACELLE CONSTRUCTION
Filed Sept. 4, 1945 2 Sheets-Sheet 1

Inventor:
Jeners S. Johnson,
by: Attorney.

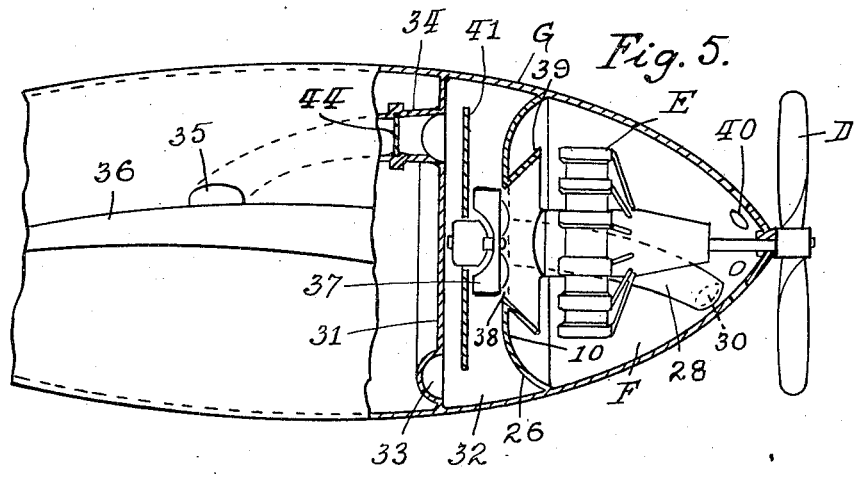
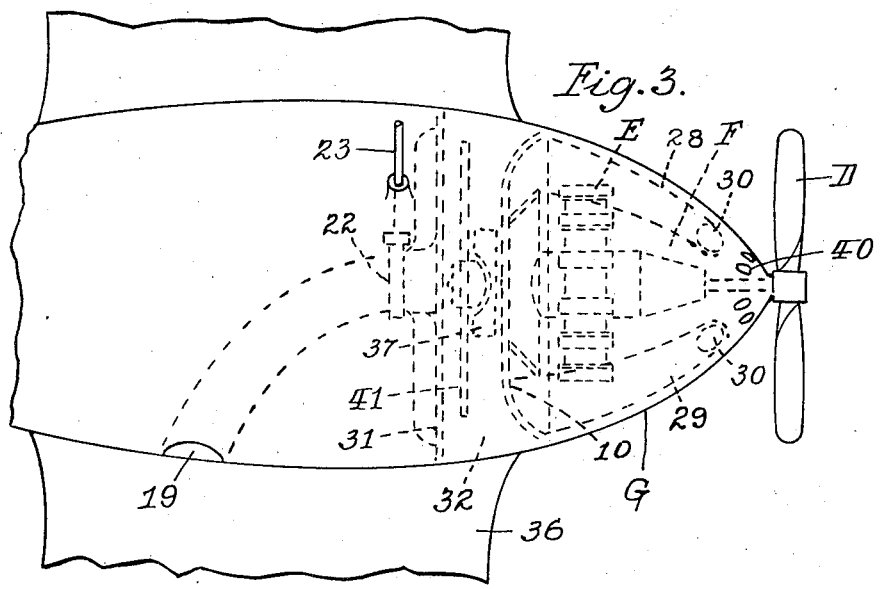

Patented Mar. 30, 1948

2,438,806

UNITED STATES PATENT OFFICE 2,438,806

ENGINE NACELLE CONSTRUCTION

Jeners S. Johnson, Los Angeles, Calif.

Application September 4, 1945, Serial No. 614,259

4 Claims. (Cl. 244—53)

This invention relates to improved means for controlling the operation of an induced current of air in an engine compartment of an air craft to remove the hot air from the compartment and cool the engine, resist sound emission from the engine and assist in creating lifting power for the aircraft.

It is an object of this invention to provide improved means and method of simple, reliable and effective character to rapidly remove hot air from the engine compartment of an airplane in a highly effective manner and to simultaneously reduce the noise emitted by the engine. It is a further object to provide means by which the current of air which is employed for removing the heat and reducing noise can be diverted and directed down and out of the engine compartment immediately back of the propeller to augment lifting power. It is further an object of the invention to provide simple, practical, inexpensive and efficient means which is readily embodied in an aircraft structure for reducing noise emitted in the engine compartment and in a manner which permits entrance of cooling and freshening air into said compartment. It is also a further object of the invention to mechanically expedite the flow of hot air from the engine compartment and to convey it by way of an air conduit to a discharge point rearwardly over the upper surface of the wing structure in the air flow of the aircraft so as to assist in propelling the aircraft forwardly.

Figure 1:
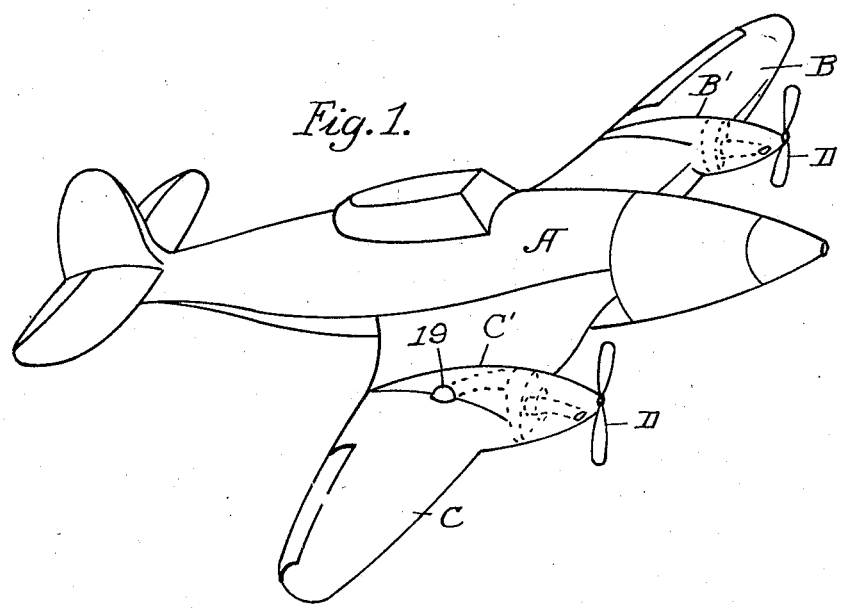
Figure 2:
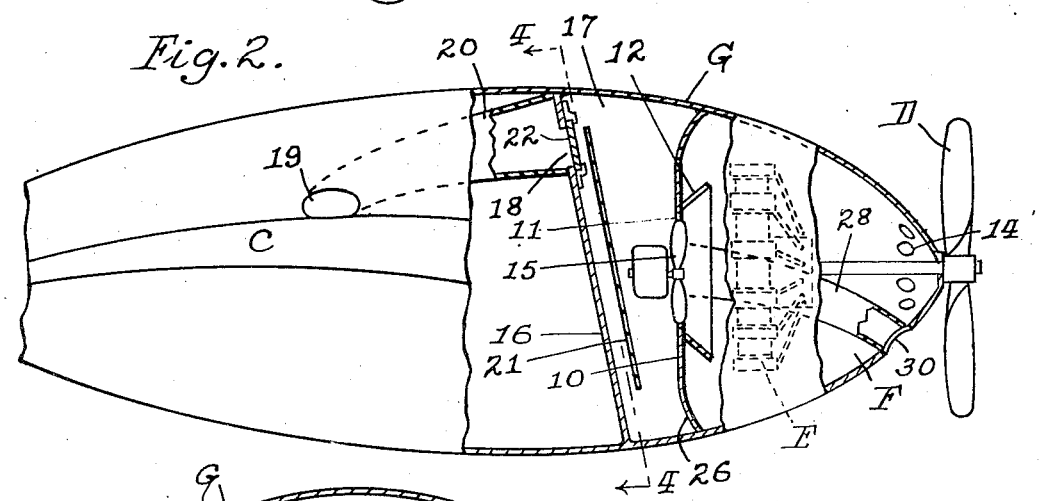
Figure 4:
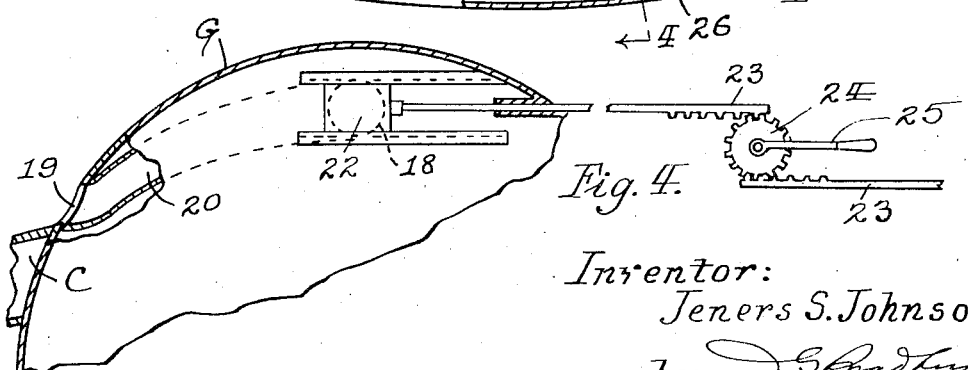

In the accompanying drawings forming part of this specification, Fig. 1 is a perspective view of an aircraft embodying the invention; Fig. 2 is a part central sectional view through a portion of one of the propeller units; Fig. 3 is a plan of a portion of one of the propeller units when constructed with an assemblage of parts as illustrated partly in Fig. 2 and partly in Fig. 5; Fig. 4 is a sectional diagrammatic view taken approximately on line 4—4 of Fig. 2, illustrating manually operable means for controlling the outlet duct leading from the air controlling chamber back of the engine compartment, and Fig. 5 is a central longitudinal section, in part of the portion of the aircraft shown in Fig. 2, illustrating an alternative construction of my improvement.

In the drawings, A indicates the main body of an aircraft having the usual members B and C of the wing structure. Propeller units B'—C' are provided, one propeller unit shell structure G being incorporated into each wing and provided with a rotary propeller D of usual type. Each propeller is driven by the usual engine E which is mounted in an engine compartment F in the forward end of the elongated supplemental longitudinal shell body or nacelle G. Any number of the propeller units B', C' may be employed with my improvement.

The engine compartment is formed in the forward end portion of the nacelle shell G by a transverse bulkhead 10 which is normal to the longitudinal axis of said body. An air collector 12 is mounted on the forward side of said bulkhead which terminates rearwardly in a reduced mouth 11. The forward end of compartment F immediately back of the propeller D is provided with the usual air induction openings or scoops 14 through which a draft of air is admitted into the engine compartment for cooling the engine. This draft of air is augmented by a power driven suction fan 15 (Fig. 2), which is placed at the mouth 11 of the air collector so as to assist in cooling the engine and its adjunct parts and in conducting sound produced by the engine rearwardly from the engine compartment.

A rear bulkhead 16 is placed across the chamber within the nacelle G a short distance back of the bulkhead 10 and slants upwardly and rearwardly to provide an upwardly expanded air flow controlling chamber 17 into which the current of air from the engine compartment is propelled by the suction fan. The upper end portion of the rear bulkhead has an outlet 18 which is connected with an orifice 19 in its side directly over the surface of the wing structure C by duct 20 to conduct the flow of air from the engine compartment into the outside air flow of the aircraft. A baffle plate 21 is spaced in front of the surface of the auxiliary bulkhead in air controlling chamber 17 to reduce and muffle the sound emitted via the stream of air which is propelled rearwardly by the suction fan 15, said baffle plate extending over at a spaced interval in front of the mouth of the outlet 18 to cause the air to circulate upwardly and through the channel thus provided.

The mouth of the outlet 18 is fully opened, fully closed or modified by a slide valve 22 which is shown controlled by suitable operating means such as the rack and pinion connection 23 and 24 shown diagrammatically in Fig. 4. The pinion of this operating unit may be operated by any suitable means and is shown manually controlled by the handle bar 25. The rack and pinion element is also shown with a pair of rack bars whereby the valves in an opposite or of two or more propeller driving units G may be operated simultaneously by a pilot.

The bulkhead 10 has its marginal portion 26 shaped forwardly and connected at its two opposite side portions through ducts 28 and 29, (Fig. 3), with outlet ports such as 30 located at opposite sides of the forward lower portion of the body casing of the aircraft immediately back of the propeller D. By closing the outlet 18 by valve 22 the draft of air which is propelled by the suction fan 15 from the engine compartment F is forced forwardly and downwardly into the space below the forward portion of the body shell back of the propeller so as to assist in elevating the air craft when the latter is operated. This is particularly advantageous when taking off or launching the airplane. Normally the valve 22 is opened during which period any draft of air transmitted by ducts 28 and 29 rearwardly into chamber 17 is permitted to pass outwardly through duct 20 and orifice 19 over the surface of the wing structure C. My improvement is intended to be used with or without the use of the forward ducts 28 and 29 as preferred.

In the alternative construction shown in Fig. 5 the rear bulkhead 31 is arranged at right angles to the axis of the body casing G and spaced rearwardly from the forward bulkhead 10 to provide the air controlling chamber 32. The rear bulkhead is formed with an annular air collecting channel 33 which is connected by the rearwardly extending duct 34 with the egress opening 35 at the outer side portion of the body casing G immediately over the surface of the wing structure 36. A motor driven blower type fan 37 is placed in the mouth 38 of the air collector 39 by which heated air from the engine compartment is expelled rearwardly, the ingress of outside air being through the usual passages 40. The baffle plate 41 is employed in the air controlling chamber 32 to impede sound waves having their origin in the engine compartment. The forward ducts such as 28 and 29, similar to those shown in Figs 1 to 3 inclusive are employed for transmitting the current of air forwardly and downwardly through outlet ducts such as 30 immediately back of propeller D. In the latter use the slide valve 44 in the duct 34 is closed so as to divert the current of air by the blower forwardly.

In accordance with the patent statutes I have described the principles of operation of my invention together with the construction thereof which I now consider to represent the best embodiment thereof, but I desire to have it understood that the structure shown is only illustrative and that the invention can be carried out by other means and applied to uses other than those above set forth within the spirit thereof and within the scope of the following claims.

I claim:

1. An air craft having an elongated body shell provided with a propeller in advance of its forward end and an adjacent laterally extending wing structure, a forward compartment within said body shell having air induction ports back of said propeller and an air eduction passage in its rearward end portion, an engine within said compartment for driving said propeller, a blower in said eduction passage for forcing a draft of air cooling medium rearwardly through said compartment, a bulkhead inclined upwardly and rearwardly across the space in said body shell back of said compartment having a rearwardly extending duct from its upper portion extending outwardly and laterally into the air flow over the surface of the aircraft wing structure, and a baffle plate extending over the major portion and spaced in advance of said rearwardly inclined bulkhead for augmenting the muffling of sound emitted by the engine in the engine compartment.

2. An aircraft having an elongated body shell and an adjacent laterally extending wing structure, said body shell being provided with a propeller in advance of the forward end portion of said body shell, a forward bulkhead forming a forward compartment within said body shell having air induction passage means back of said propeller and air eduction passage means rearwardly through the bulkhead, driving means in said forward compartment for revolving said propeller, a blower in said air eduction means tending to force a draft of air coolant received through said induction passage means in contact with said driving means and rearwardly from said forward compartment, a supplemental bulkhead in said body shell forming an air controlling chamber therein back of said forward bulkhead to receive the flow of air from said blower, a rearwardly and laterally directed duct from said chamber opening outwardly over the surface of the aircraft wing structure to exhaust the current of air delivered by the blower into the air flow over the surface of the wing structure of the aircraft, hand actuated valve means positively controlling said air duct, and forwardly extending passage means from said air controlling chamber opening forwardly and downwardly through said body shell when said rearwardly extending duct is closed by said valve means, for the purposes specified.

3. In a structure as defined in claim 2, an air baffle plate in the air controlling chamber between said bulkheads in advance of and extending over the major portion of said supplemental bulkhead for muffling the sound transmitted by the current of air through said air controlling chamber.

4. In a structure as defined in claim 2, the supplemental bulkhead having an annular air collecting channel in its forward surface with which the valve controlled rearwardly and laterally extending duct is connected to exhaust the current of air delivered by the blower into the air flow over the surface of the wing structure of the air craft.

JENERS S. JOHNSON.

REFERENCES CITED

The following references are of record in the file of this patent:

UNITED STATES PATENTS

| Number | Name | Date |
|---|---|---|
| 1,386,493 | Guyot | Aug. 2, 1921 |
| 2,077,708 | Morse | Apr. 20, 1937 |
| 2,160,281 | Price | May 30, 1939 |
| 2,187,506 | Van Daam | Jan. 16, 1940 |
| 2,264,297 | Clay | Dec. 2, 1941 |
| 2,388,806 | Stalker | Nov. 13, 1945 |
| 2,393,899 | Gregory | Jan. 29, 1946 |